July 20, 1926.  1,593,173

H. R. HOLMES

AUTOMOBILE CONSTRUCTION

Filed August 15, 1925  2 Sheets-Sheet 1

Inventor
Harleigh R. Holmes.
By A. J. O'Brian
Attorney

July 20, 1926. 1,593,173
H. R. HOLMES
AUTOMOBILE CONSTRUCTION
Filed August 15, 1925 2 Sheets-Sheet 2
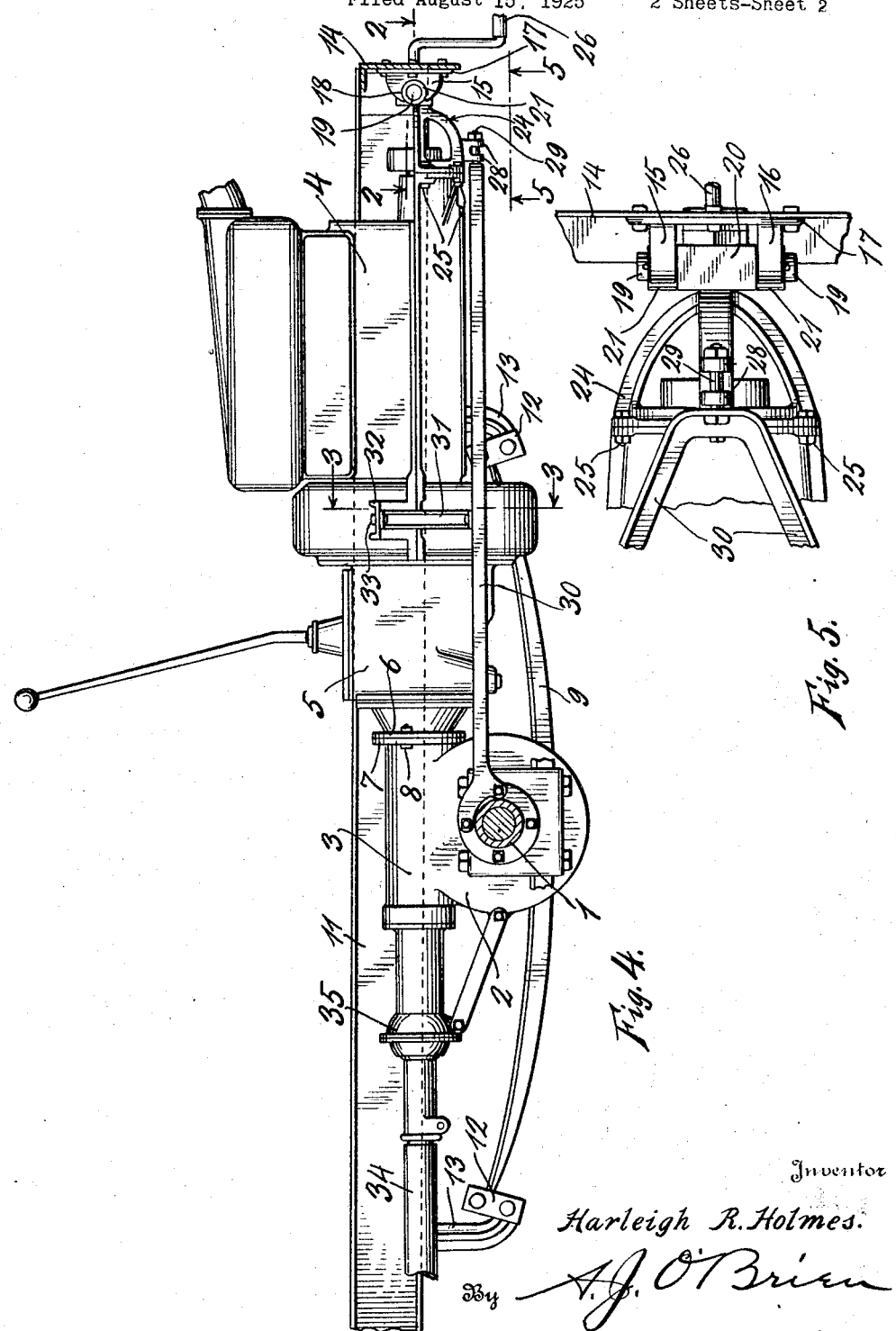
Inventor
Harleigh R. Holmes.
By A. J. O'Brien
Attorney Patented July 20, 1926.

1,593,173

UNITED STATES PATENT OFFICE.

HARLEIGH R. HOLMES, OF LITTLETON, COLORADO.

AUTOMOBILE CONSTRUCTION.

Application filed August 15, 1925. Serial No. 50,513.

This invention relates to improvements in automobile construction and relates more particularly to the manner of supporting the engine and of connecting the same to the differential housing. My invention has particular application to cars or trucks having a four wheel drive but may also be employed in connection with ordinary constructions.

My invention, briefly described, consists in securing the rear end of the transmission casing to the differential housing of the adjacent axle and then securing the front end of the engine to the chassis frame by means of a universal joint coupling. This greatly simplifies the construction of four wheel drive cars.

My invention can be most clearly described and will be most readily understood when reference is had to the accompanying drawings in which the preferred embodiment thereof is shown, and in which—

Fig. 4 is a side elevation taken along line 4—4 in Fig. 1, and

Fig. 5 is a bottom plan view looking upwardly along line 5—5 Fig. 4.

Figure 1:
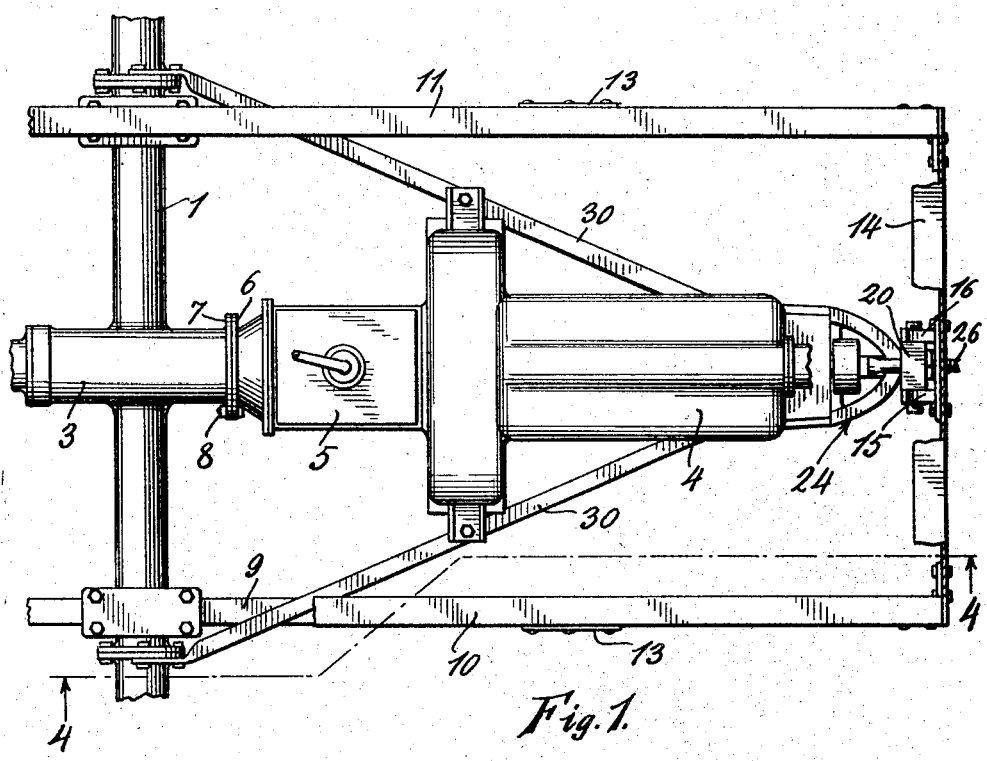
Fig. 1 is a plan view of the forward end of an automobile chassis frame and shows an engine in place thereon.
Figure 2:
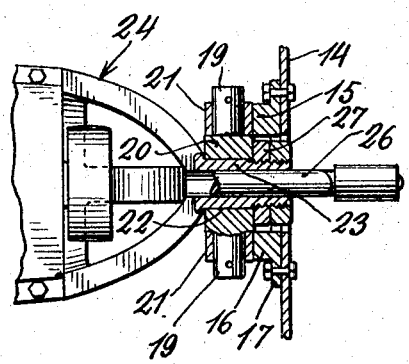
Fig. 2 is a section taken on line 2—2 Fig. 4 and shows the trunnion that extends longitudinally.
Figure 3:
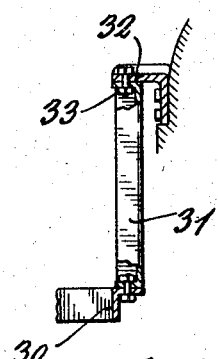
Fig. 3 is a section taken on line 3—3 Fig. 4.

In the drawings numeral 1 designates the axle casing for the front axle of a four wheel drive truck and 2 the differential housing which, in the example shown, contains a worm wheel drive; the worm being located within the upper cylindrical portion 3. Numeral 4 represents an internal combustion engine of any standard make and to the rear end of which a transmission casing 5 is secured. Casing 5 contains the usual gear assembly employed for this purpose. The rear end of the transmission casing has a flange 6 which fits against the flange 7 of the worm cylinder 3 and which is secured to the flange 7 by means of bolts 8 of which only one has been shown as an example. Springs 9 are secured to the axle casing 1 by suitable means and have their free ends connected to the underside of the frame members 10 and 11 by means of shackles 12 and brackets 13. The forward ends of the side channels 10 and 11 are connected by means of an angle iron 14. Secured to the inside of the vertical flange of the angle 14 are two spaced brackets 15 and 16 which project from the rear surface of the base 17. The brackets 15 and 16 have openings 18 that intersect the rear surface of the brackets 15 and 16 so that the trunnion 19 of the perforated supporting member 20 may be inserted into them. Steel bushings 21 are inserted into the openings 18 and over the trunnions 19. These bushings have a driving fit with the walls of the openings 18 so that they will be held against rotation and endwise displacement and as a further security they may be held onto the trunnions 19 by means of pins or other equivalent means. The supporting member 20 has a central opening 22 extending therethrough in a direction perpendicular to the axis of the trunnions 19. The opening 22 receives and forms a bearing for the tubular trunnion 23 that projects forwardly from the attaching bracket 24 that is secured to the front end of the engine by means of bolts 25 in the manner shown in Figs. 4 and 5. The axis of the tubular trunnion 23 is in line with the axis of the crank shaft and serves as a bearing for the starting crank 26 by means of which the engine may be rotated in the usual manner. The forward end of the tubular trunnion 23 is threaded for the reception of nuts 27 (Fig. 2). Extending downwardly from the bracket 24 are spaced lugs 28 (Figs. 4 and 5) which are perforated for the reception of a bolt 29 by means of which the forward end of the radius rods 30 are held against sidewise movements. The engine is supported in part from the radius rods 30 by means of angle irons 31 whose upper ends are secured to the engine brackets 32 by bolts 33 in the manner shown in Fig. 3.

From the above descriptions it is evident that the rear end of the engine is supported directly by the axle housing 1 and that the engine has a rotary movement about the axle. The front end is supported from the chassis frame in the manner shown and described and the frame is supported from the axle housing by means of springs. It is evident therefore that when the springs yield and the frame moves with respect to the axle that there will be a slight rotation on the trunnions 19 while any twisting action such as may be caused by uneven loading or unevenness in the road is taken care of by rotation about the tubular trunnion 23.

In four wheel drive trucks a torque shaft 34 extends to the rear axle where it connects with a worm in a differential similar to that shown. It is necessary to provide a universal coupling between the front and rear axles and this has been indicated by numeral 35 in Fig. 4. By means of the simple expedient of coupling the engine directly to the driving worm of the differential the construction is greatly simplified and only a single universal is needed whereas in some forms of four wheel drive trucks as many as six universals are used.

Having now described my invention, what I claim as new is:—

An automotive vehicle comprising, in combination, an axle housing having a differential gear housing and containing a drive shaft, a frame supported by said axle housing, said frame having side members and a transverse member, a motor having one end rigidly connected with the differential gear housing and its forward end connected to the transverse frame member by means permitting a universal movement between the motor and frame, a second frame comprising two angularly related integral arms whose spaced ends are connected to the axle housing and whose other ends are connected to the underside of the engine by means that permits the frame and engine to have relative rotation and means for connecting the engine to said arms, said means comprising outwardly extending lugs carried by the engine.

In testimony whereof I affix my signature.

HARLEIGH R. HOLMES.